(12) United States Patent
Schatz

(10) Patent No.: US 10,033,171 B2
(45) Date of Patent: Jul. 24, 2018

(54) PROTECTIVE COMPONENT FOR POWER CABLE OF AN INDUSTRIAL ELECTRO-MAGNETIC LIFTING DEVICE

(71) Applicant: Winkle Industries, Inc., Alliance, OH (US)

(72) Inventor: Joseph T. Schatz, North Canton, OH (US)

(73) Assignee: Winkle Industries, Inc., Alliance, OH (US)

( * ) Notice: Subject to any disclaimer, the term of this patent is extended or adjusted under 35 U.S.C. 154(b) by 0 days.

(21) Appl. No.: 15/357,152

(22) Filed: Nov. 21, 2016

(65) Prior Publication Data

US 2017/0149220 A1   May 25, 2017

Related U.S. Application Data

(60) Provisional application No. 62/257,374, filed on Nov. 19, 2015.

(51) Int. Cl.
*F16L 27/02* (2006.01)
*H02G 3/04* (2006.01)
*H02G 3/02* (2006.01)

(52) U.S. Cl.
CPC ............ *H02G 3/0475* (2013.01); *H02G 3/02* (2013.01); *F16L 27/02* (2013.01)

(58) Field of Classification Search
CPC ..... H02G 3/0475; F16L 11/18; G02B 6/4461; F16C 1/20; F16C 1/26; F16C 1/267; Y10T 74/20456; Y10T 74/20462; Y10T 74/2045; Y10T 74/20444

USPC ..... 138/120, 109, 110; 285/146.1, 261, 264; 403/114
See application file for complete search history.

(56) References Cited

U.S. PATENT DOCUMENTS

| | | | | |
|---|---|---|---|---|
| 4,396,797 A | * | 8/1983 | Sakuragi | F16L 11/18 138/110 |
| 5,215,338 A | * | 6/1993 | Kimura | F16L 3/015 138/120 |
| 5,449,206 A | * | 9/1995 | Lockwood | F16L 11/18 138/120 |
| 5,899,425 A | * | 5/1999 | Corey, Jr. | A61B 17/02 248/276.1 |
| 6,250,175 B1 | * | 6/2001 | Noetzold | F16C 1/20 74/502.3 |

(Continued)

*Primary Examiner* — Patrick F Brinson
(74) *Attorney, Agent, or Firm* — Dureska & Moore, LLC; Brent L. Moore

(57) ABSTRACT

A protective component for a power cable of an industrial electro-magnetic lifting device includes a top portion and a bottom portion. The protective component is formed with an opening, which extends through the top and bottom portion to enable the protective component to be disposed around a power cable of a lifting magnet. The bottom portion includes an inner diameter, which enables the top portion of a second subsequent protective component disposed around the power cable to nest or rest within the bottom portion. A plurality of protective components can be disposed around the power cable so that each protective component bottom opening mates with the top portion of a preceding protective component and the top portion mates with the bottom opening of a subsequent protective component to protect the power cable.

11 Claims, 12 Drawing Sheets

(56) References Cited

U.S. PATENT DOCUMENTS

| | | | | |
|---|---|---|---|---|
| 6,648,376 B2* | 11/2003 | Christianson | ............. | E03C 1/06 138/120 |
| 7,272,922 B2* | 9/2007 | Fahrion | .................. | F16G 13/10 59/2 |
| 7,337,808 B2* | 3/2008 | Shamir | ................. | E03C 1/0408 138/120 |
| 7,533,906 B2* | 5/2009 | Luettgen | ................ | H01R 35/00 285/146.1 |
| 7,634,874 B2* | 12/2009 | Lucas | ..................... | E04H 4/082 52/108 |
| 2001/0025542 A1* | 10/2001 | Noetzold | ................. | F16C 1/20 74/502.5 |
| 2009/0121477 A1* | 5/2009 | Pradeilles | ................ | E03C 1/06 285/146.1 |
| 2010/0116373 A1* | 5/2010 | Watson | .................. | B29C 63/18 138/140 |
| 2011/0034257 A1* | 2/2011 | Wen | .......................... | F16C 1/26 464/173 |
| 2012/0160537 A1* | 6/2012 | Wen | .......................... | F16C 1/26 174/102 R |

\* cited by examiner

US 10,033,171 B2

PROTECTIVE COMPONENT FOR POWER CABLE OF AN INDUSTRIAL ELECTRO-MAGNETIC LIFTING DEVICE

CROSS-REFERENCE TO RELATED APPLICATION

This application claims the benefit of U.S. Provisional Patent Application Ser. No. 62/257,374, filed Nov. 19, 2015.

BACKGROUND OF THE INVENTION

Technical Field

The present invention relates generally to the art of below-the-hook electro-magnetic lifting devices. More particularly the invention is directed to a protective component for a power cable of an industrial electro-magnetic lifting device. More specifically, the present invention is directed to a protective component that is disposed around and along a desired length of the power cable on a lifting magnet to protect the power cable from being damaged during operation of the lifting device. The protective component is easy to manufacture and assemble onto the power cable and substantially eliminates the potential of the power cable becoming pinched, cut and/or severed, smashed or otherwise physically damaged during operation of the electro-magnetic lifting device.

Background Art

Industrial electro-magnetic lifting devices are generally well known in the metals market and are utilized to support the handling of ferrous metals and related end products. A typical industrial electro-magnetic lifting device includes an overhead and/or mobile crane that is operatively connected to a lifting magnet. The lifting magnet is an electromagnetic device that is energized by an electrical power source that is located on the crane and which provides electrical power via a power cable to the lifting magnet. When the magnet is energized, a strong magnetic field is generated in and at the bottom of the magnet. The crane lifts, lowers and transports the magnet, and contains controls that supply electrical current to the lifting magnet, which in turn energizes and de-energizes the magnet to control the magnetic field in order to lift and drop ferrous metal objects and transport them from one location to another. More specifically, the electro-magnet is energized or powered and de-energized or non-powered by a power source on the crane and related electrical cable also on the crane, which is connected to the power lead box of the magnet. As such, the crane operator is able to energize the magnet when desired in order to control the electro-magnetic field in the magnet in order to lift and drop ferrous metal objects. Once metal objects are electro-magnetically attracted or attached to the magnet, the crane raises, lowers and moves the attached lifting magnet in order to transport and place metal objects from one location to another location. Upon placement of the metal objects at a desired location, the operator of the crane de-energizes, removes, or reduces power directed to the lifting magnet, and the lifting magnet releases the metal objects, leaving them at their desired location.

The power cable that extends from the crane to the lifting magnet is very susceptible to physical damage during operation. More specifically, during operation of the crane and attached lifting magnet, the power cable can potentially become cut and/or severed, pinched, smashed, compressed, or otherwise physically damaged. Such physical damage imparted to the power cable can in turn potentially damage the power cable, lifting magnet and/or power source components on the crane, leading to safety and reliability concerns, as well as increased maintenance and repair costs.

Therefore, a need exists in the art for a protective component for a power cable of an industrial electro-magnetic lifting device that is simple to manufacture and assemble or attach to the power cable, which shields the power cable from physical damage during operation of the electro-magnetic lifting device, while also allowing the power cable to bend as needed for proper operation of the power cable and the lifting device. The protective component for a power cable of an industrial electro-magnetic lifting device of the present invention proactively supports safe use and aids in reducing premature failures of electro-magnetic lifting devices and related power supplies.

BRIEF SUMMARY OF THE INVENTION

An objective of the present invention is to provide a protective component for a power cable of an industrial electro-magnetic lifting device that is simple to manufacture.

Another objective of the present invention is to provide a protective component for a power cable of an industrial electro-magnetic lifting device that is simple to assemble or attach to the power cable.

Yet another objective of the present invention is to provide a protective component for a power cable of an industrial electro-magnetic lifting device that shields the power cable from physical damage during operation of the electro-magnetic lifting device, while allowing the cable to remain flexible.

These objectives and others are obtained by the protective component for a power cable of an industrial electro-magnetic lifting device of the present invention, which includes a body having a top portion and a bottom portion, the body having an opening formed through the top portion and an opening formed through the bottom portion, the top portion opening and the bottom portion opening being continuous with one another to enable the protective component to be disposed around a power cable, the body top portion being capable of nesting within the body bottom portion opening of a second protective component disposed around the power cable.

BRIEF DESCRIPTION OF THE SEVERAL VIEWS OF THE DRAWINGS

The exemplary embodiment protective component for a power cable of an industrial electro-magnetic lifting device of the present invention, illustrative of the best mode in which Applicant has contemplated applying the principles of the present invention, is set forth in the following description and is shown in the drawings, and is particularly and distinctly pointed out and set forth in the claims.

Similar numerals refer to similar parts through the drawings.

DETAILED DESCRIPTION OF THE INVENTION

Figure 1:
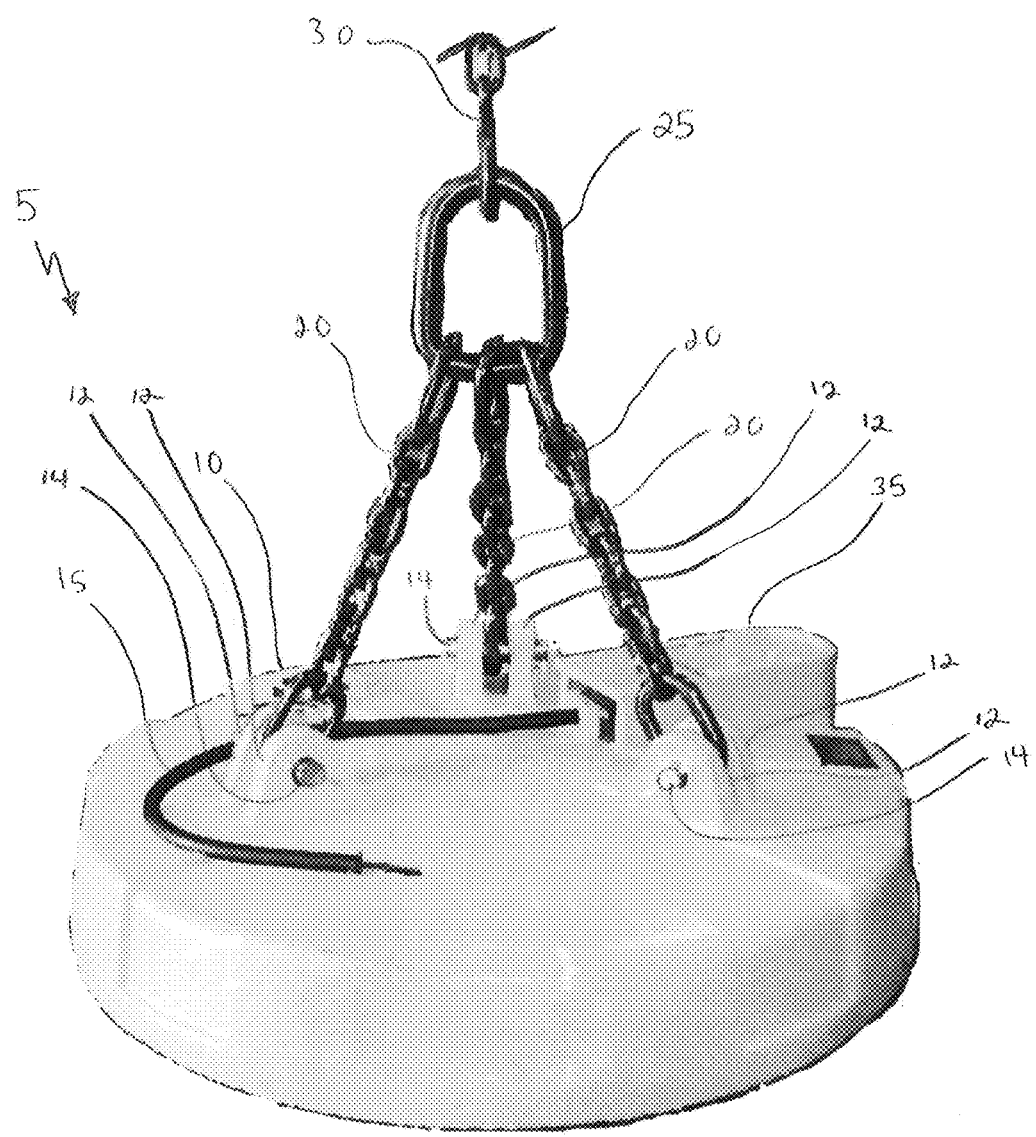
FIG. 1 is a perspective view of a magnet of an industrial electro-magnetic lifting device, showing one end of a portion of the power cable extending out of the lead box of the magnet and showing the other end of the power cable free of connection, prior to being connected to the crane.

In order to better understand the protective component of the present invention and the environment in which it operates, a prior art lifting magnet for an industrial electro-magnet lifting device is shown in FIG. 1 and is indicated generally at 5. Lifting magnet 5 is an electro-magnet capable of producing a magnetic field for lifting ferrous metal objects upon introduction of electricity to a plurality of electro-magnetic field inducing components (not shown) of the lifting magnet. Industrial electro-magnet 5 includes a casing 10, which houses the electro-magnetic field inducing components of the lifting magnet. Casing 10 is formed with three pairs of lugs 12 for attaching lifting magnet 5 to a crane (not shown). More specifically, lifting magnet 5 includes a plurality of lifting chains 20. Each lifting chain 20 is attached to a respective pair of lugs 12 by a pin 14 disposed through the lifting chain and a horizontally aligned opening (not shown) foliated in each of the respective pair of lugs. Plurality of lifting chains 20 are in turn attached to a crane ring 25. Crane ring 25 is attached to a crane chain 30, which attaches lifting magnet 5 to the crane of the industrial electro-magnetic lifting device (not shown).

Lifting magnet 5 includes a power cable 15 operatively connected at a first end to a power lead box 35 housed within casing 10. During operation, power cable 15 is operatively connected at a second end to a power source (not shown) located on the crane of the industrial electro-magnetic lifting device. Lifting magnet 5 is energized or powered and de-energized or non-powered by the crane power source through transfer of electrical current to lead box 35 via power cable 15, and ultimately to the electro-magnetic field inducing components of the lifting magnet. Utilizing controls (not shown) located on the electro-magnetic lifting device crane, a crane operator can lift, lower, and transport electro-magnet 5, and control the electrical current directed to lifting magnet 5 to energize and de-energize the magnet to control the magnetic field in order to lift and drop ferrous metal objects and transport the objects from one location to another.

As discussed above, power cable 15 is susceptible to potential physical damage during operation of the crane. More specifically, during operation of the crane, power cable 15 can potentially become cut and/or severed, pinched, smashed, compressed, or otherwise physically damaged. Such physical damage imparted to power cable 15 can in turn potentially damage the power cable, lifting magnet 5 and/or power source components on the crane, leading to safety and reliability concerns, as well as increased maintenance and repair costs.

An exemplary embodiment protective component for power cable 15 of an industrial magnetic lifting device employing a magnet, such as lifting magnet 5, is indicated generally at 100 and is shown in FIGS. 2-11. Exemplary embodiment protective component 100 has a generally cylindrical bell shape. Exemplary embodiment protective component 100 includes a top portion 110 and a bottom portion 120. Top portion 110 includes an external wall 101 having a cross sectional radius of about 1⅛" and an inner wall 102 having a cross sectional radius of about 1¾".

Figure 3:
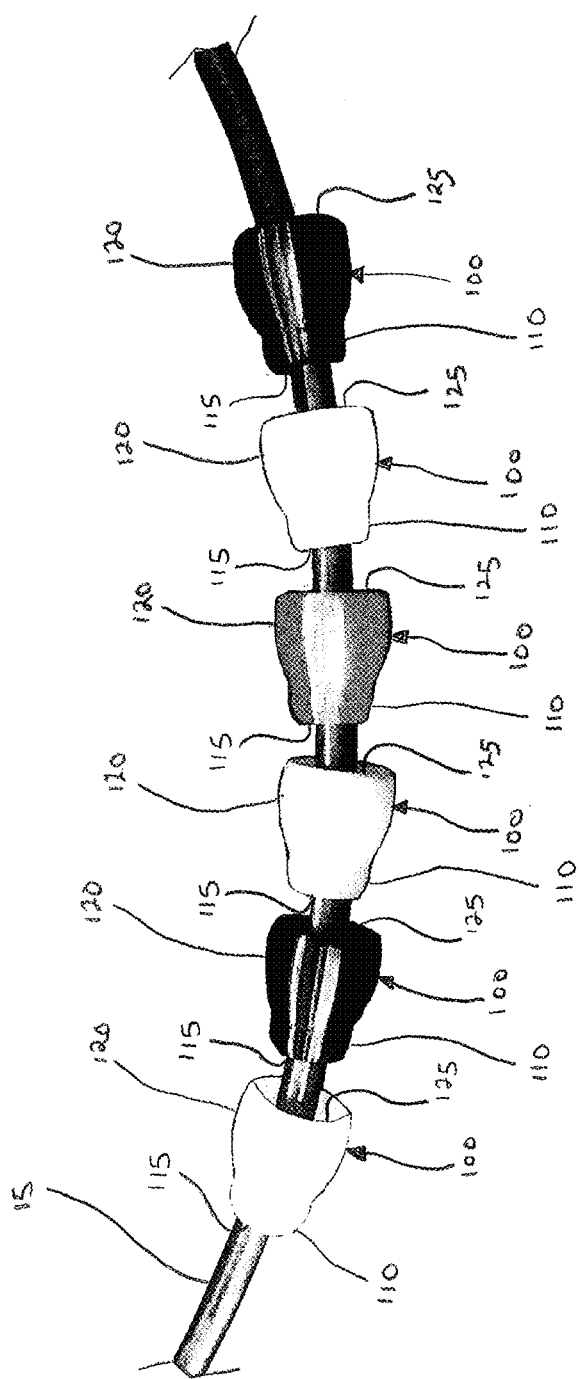
FIG. 3 is a view similar to FIG. 2, but showing the plurality of exemplary embodiment protective components disposed around the power cable and spaced away from one another.
Figure 4:
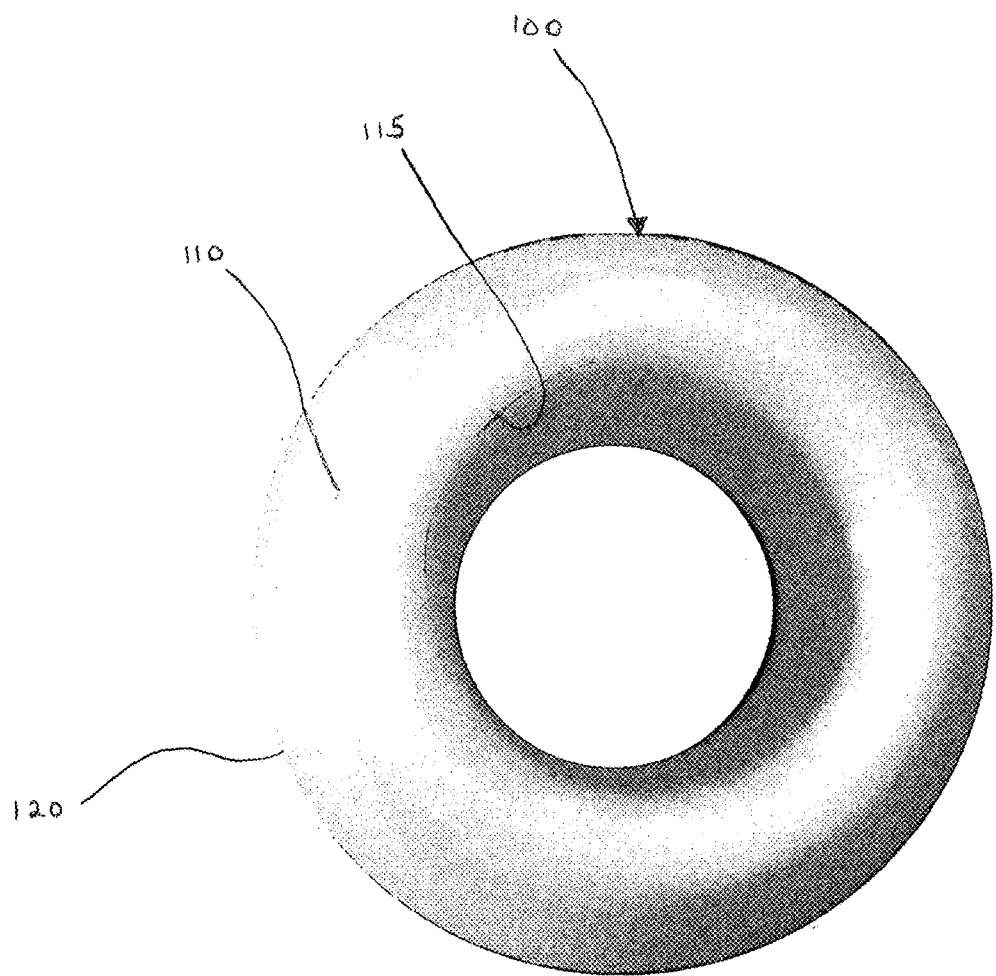
FIG. 4 is a top plan view of one of the exemplary embodiment protective components for a power cable of an industrial electro-magnetic lifting device of the present invention shown in FIG. 2, removed from the power cable and showing an opening formed in the protective component and extending through the length of the protective component.
Figure 5:
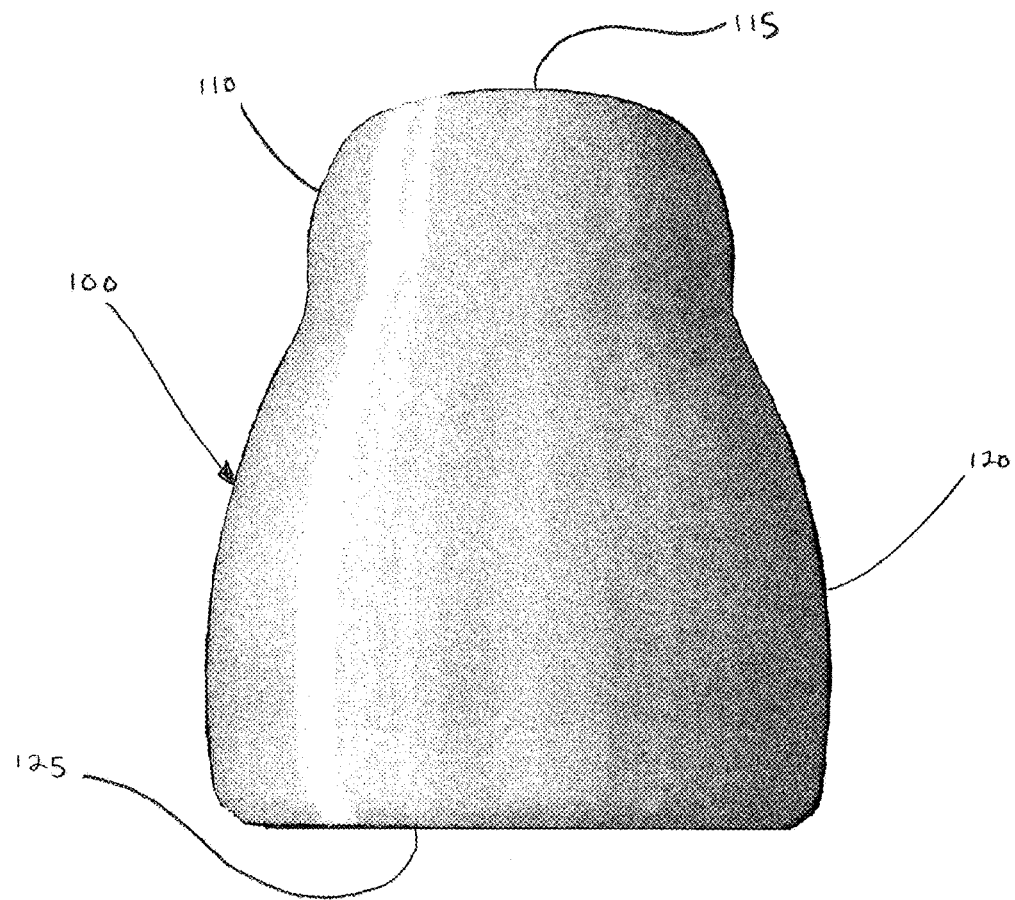
FIG. 5 is a side elevational view of the exemplary embodiment protective component of the present invention shown in FIG. 4, showing the outer contour of the protective component.
Figure 6:
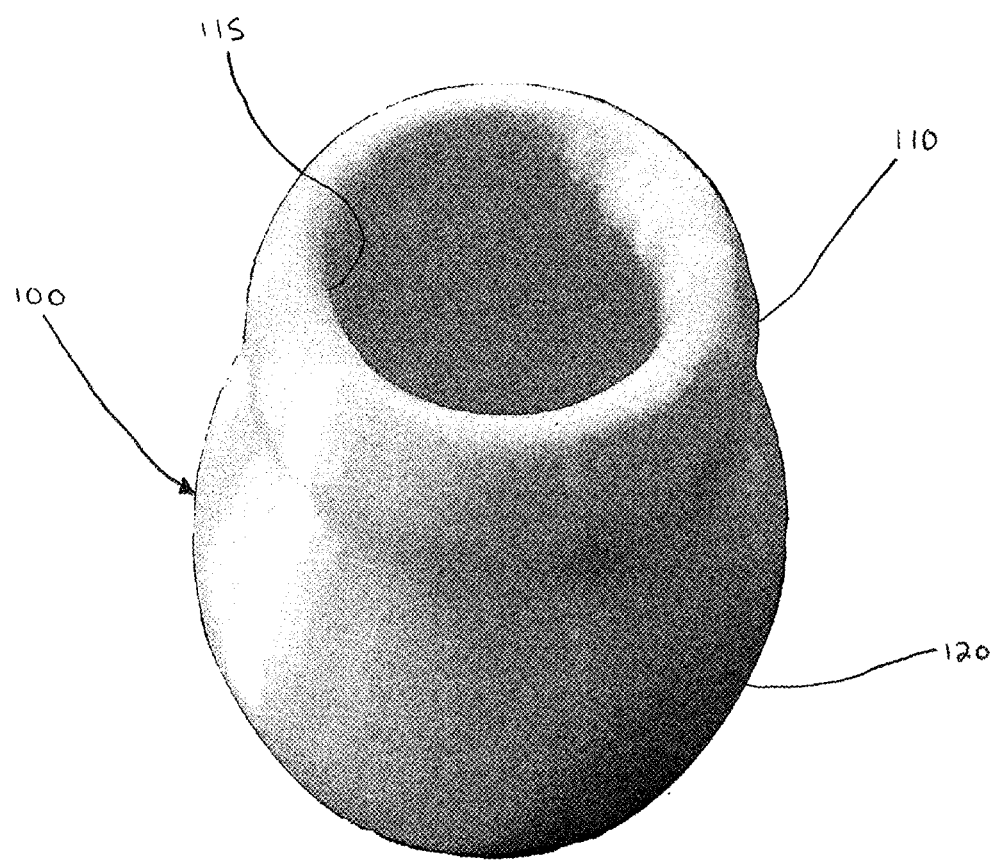
FIG. 6 is a top perspective view of the exemplary embodiment protective component of the present invention shown in FIG. 4, showing the opening at the top of the protective component.
Figure 7:
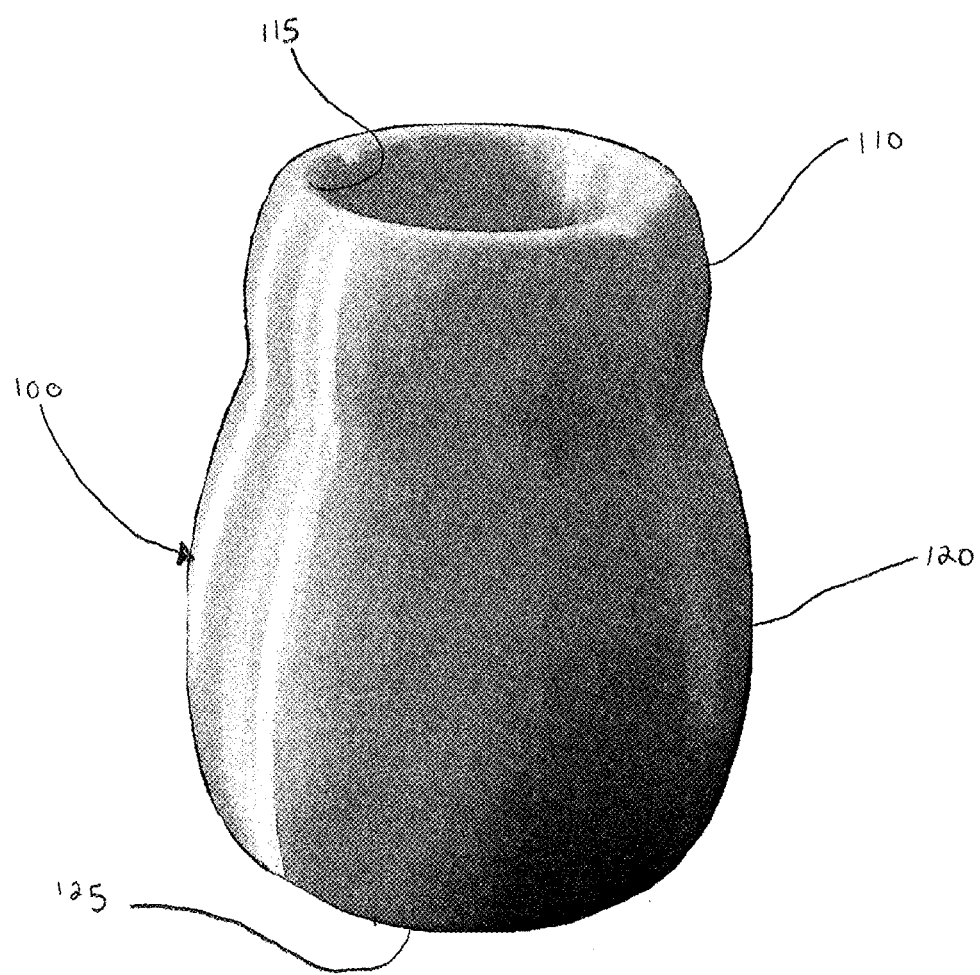
FIG. 7 is a view similar to FIG. 6.
Figure 8:
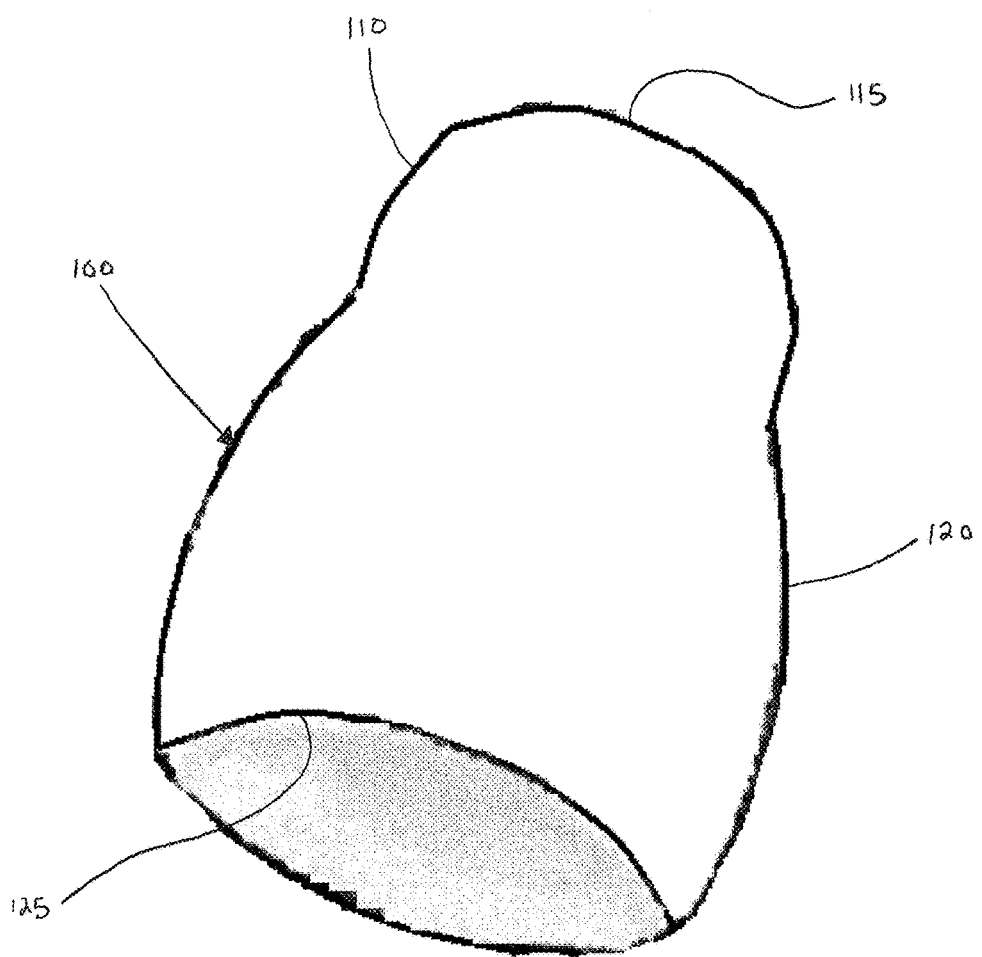
FIG. 8 is a bottom perspective view of the exemplary embodiment protective component of the present invention shown in FIG. 4, showing the opening at the bottom of the protective component.
Figure 9:
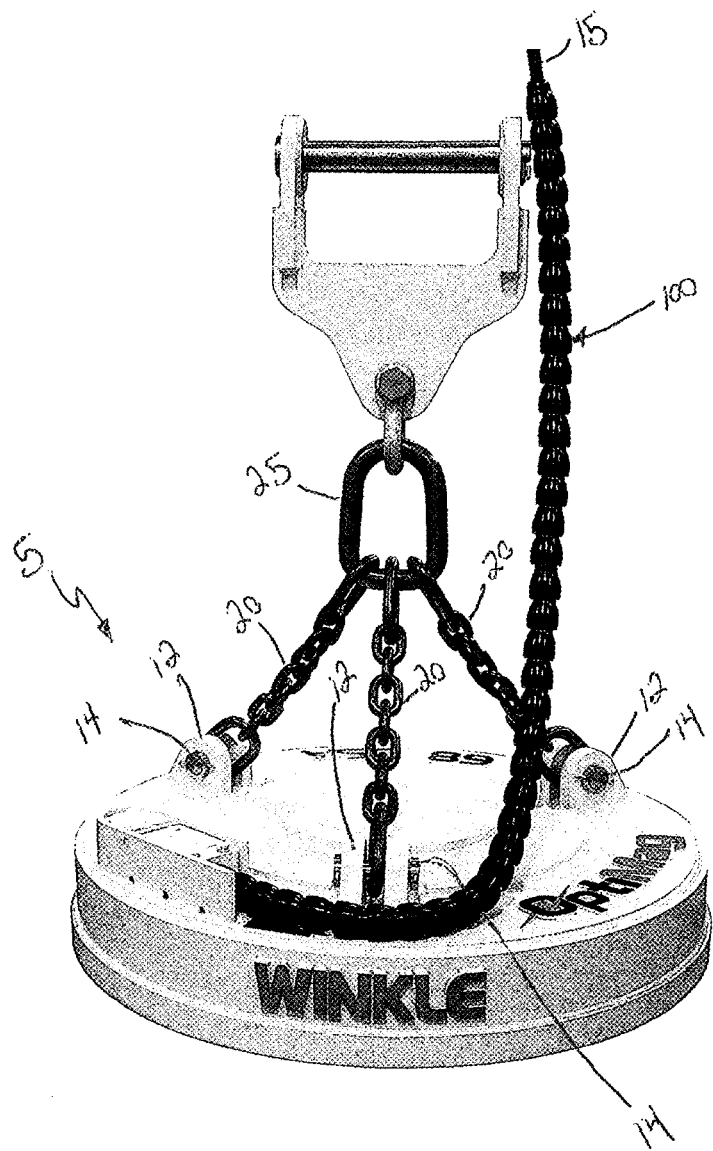
FIG. 9 is a perspective view of a magnet of an industrial electro-magnetic lifting device incorporating a plurality of exemplary embodiment protective components of the present invention disposed around the power cable of the lifting magnet.
Figure 10:
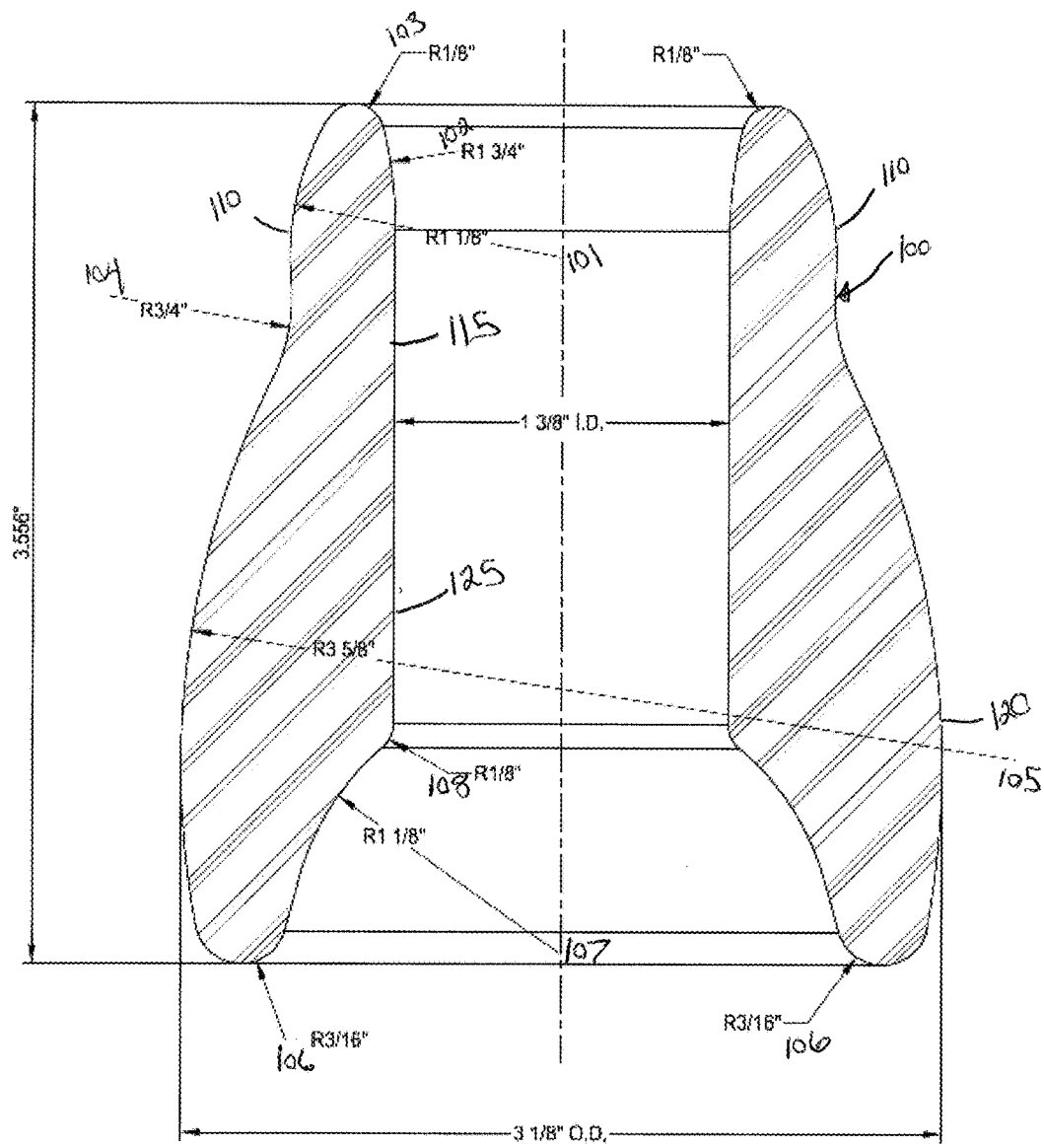
FIG. 10 is a cross sectional elevational view of the exemplary embodiment protective component of the present invention shown in FIG. 4, showing the internal diameter of the top and bottom portion openings as well as showing the complimentary shape of the top portion and the bottom portion of the protective component.

An uppermost part 103 of upper portion 110 includes a cross sectional radius of about ⅛". A transition 104 between upper portion 110 and bottom portion 120 includes a cross sectional radius of about ¾". Bottom portion 120 has an external wall 105 having a cross sectional radius of about 3⅝". Bottom portion 120 also includes a bottommost portion 106 having a cross sectional radius of of about 3/16". Bottom portion 120 includes an internal wall 107 having a cross sectional radius of about 1⅛". An internal transition wall 108 is disposed between internal wall 107 and an opening 125 formed through bottom portion 120 and includes a cross sectional radius of about ⅛". Top portion 110 has a generally smaller outer diameter than bottom portion 120, which provides exemplary embodiment protective component 100 with a tapered profile from the bottom to the top of the protective component. As best shown in FIGS. 4, 6, 7 and 10, top portion 110 is formed with a generally cylindrical opening 115, which provides the top portion with a generally hollow interior. As best shown in FIGS. 3, 8 and 10, bottom portion 120 is also formed with generally cylindrical opening 125, which provides the bottom portion with a hollow interior. Openings 115 and 125 have an inside diameter of about 1⅜". Openings 115 of top portion 110 and opening 125 of bottom portion 120 are connected so that there is a continuous opening through the vertical length of protective component 100, which enables the protective component to be disposed around the power cable of an industrial electro-magnetic lifting device, such as power cable 15 (FIG. 1). The outside diameter of bottom portion 120 is about 3⅛". The overall length of protective component 100 of the present invention is about 3.556".

Figure 11:
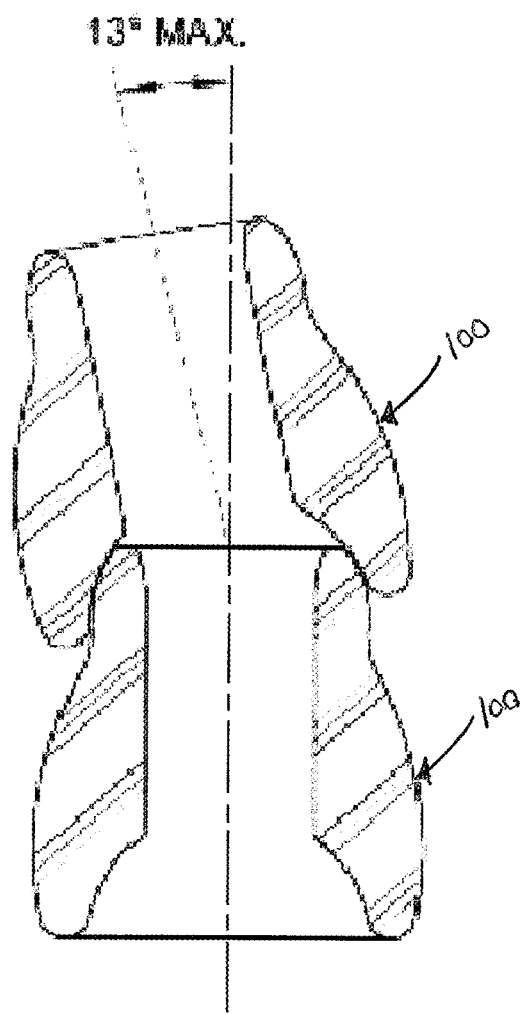
FIG. 11 is a cross sectional elevational view of a pair of exemplary embodiment protective components of the present invention, showing the angle between adjacent protective components.
Figure 12:
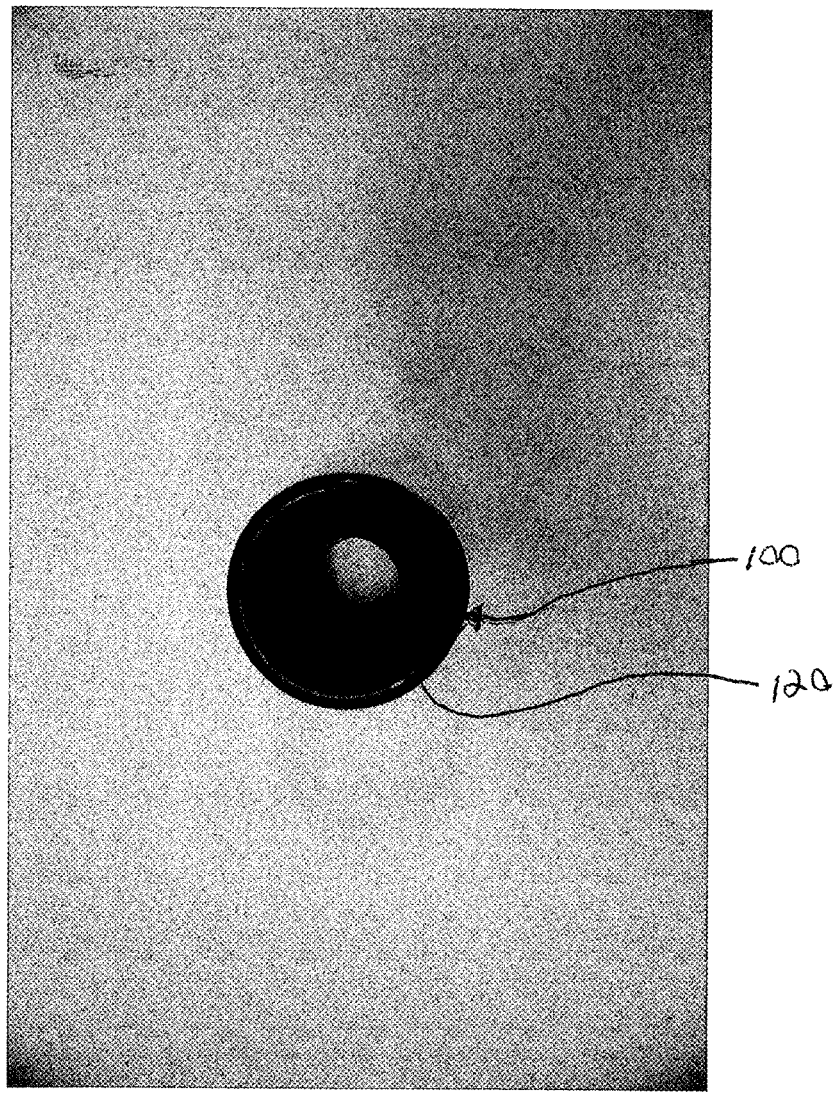
FIG. 12 is a bottom perspective view of the exemplary embodiment protective component of the present invention shown in FIG. 4.

In accordance with an important feature of the present invention, top portion outer wall 101 of exemplary embodiment protective component 100 is correspondingly shaped to internal wall 107 of bottom portion 120 so that the top portion of a first protective component 100 can nest or rest in the hollow interior of the bottom portion of a second protective component 100. Top portion 110 of a first exemplary embodiment protective component 100 nests within bottom portion 120 of a second exemplary embodiment protective component 100 so that it is capable of pivoting within the second protective component opening 125. More specifically, the longitudinally length of a first exemplary embodiment protective component 100 is capable of pivoting about 13° in all directions relative to the longitudinally centerline of a second protective component 100 when the first protective component top portion 110 is nested within bottom portion 120 of the second protective component as shown in FIG. 11. In this manner, a plurality of protective components 100 may be utilized in conjunction with one another to provide protection to or shield power cable 15 along a desired length of the power cable on which they have been disposed, while maintaining maximum allowable manufacturer bending radius allowances for the power cable.

Figure 2:
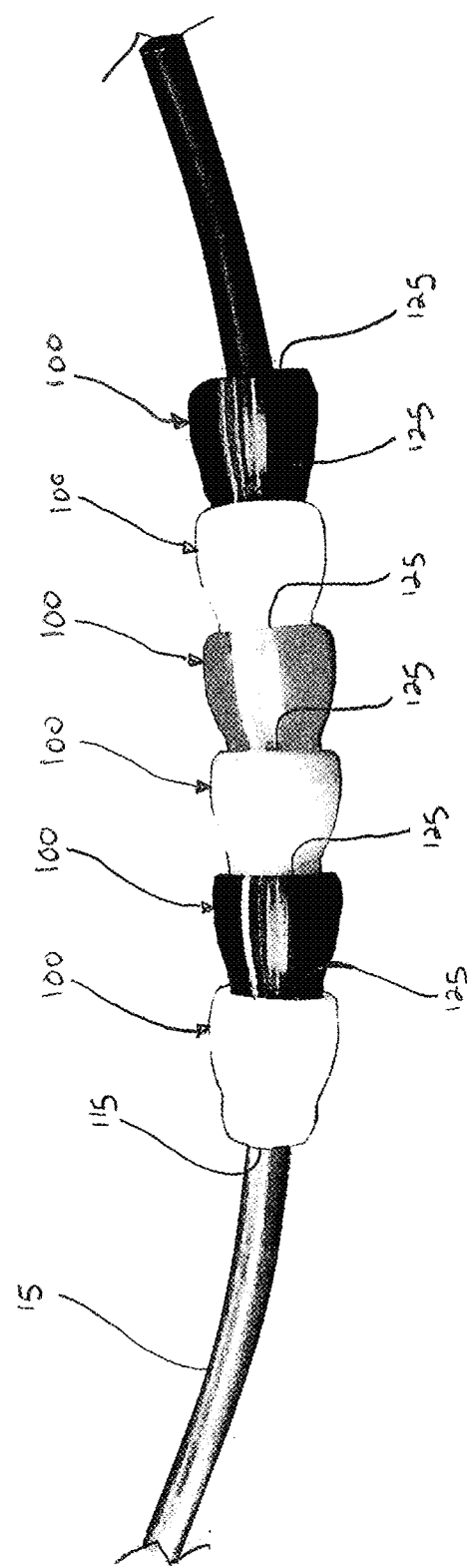
FIG. 2 is a greatly enlarged view of a portion of the power cable shown in FIG. 1, showing a plurality of exemplary embodiment protective components of the present invention disposed around and along the power cable.

To illustrate the above premise, a plurality of exemplary embodiment protective components 100 for a power cable of an industrial magnetic lifting device are shown in FIGS. 2 and 3 disposed on and around power cable 15 of lifting magnet 5. FIG. 2 shows the position of the plurality of exemplary embodiment protective components 100 when in operation. As shown in FIG. 2, power cable 15 is protected or shielded by exemplary embodiment protective components 100 of the present invention, preventing the power cable from becoming physically damaged during operation of the industrial magnetic lifting device, while maintaining flexibility of power cable 15.

In accordance with another important aspect of the present invention, exemplary embodiment protective component 100 provides simple assembly or attachment to power cable 15. With reference to FIG. 3, in order to protect or shield power cable 15 utilizing exemplary embodiment protective component 100, an operator must simply dispose a plurality of the exemplary embodiment protective components around the power cable so that they are aligned with top portion 110 of each protective component facing bottom portion 120 of a subsequent protective component. The operator must then simply slide the plurality of protective components 100 together to nest top portion 110 of each protective component within bottom portion 120 of a subsequent protective component.

In accordance with yet another important aspect of the present invention, exemplary embodiment protective component 100 is formed of a durable material, such as a high-density polymer. More specifically, exemplary embodiment protective component 100 is formed of a material capable of protecting or shielding power cable 15 during operation of the industrial electro-magnetic lifting device. More specifically, exemplary protective component 100 is formed of a material having a durometer preferably within the range of from about 25 to 100. Exemplary embodiment protective component 100 is more preferably formed of a material having a durometer within the range of from about 65 to 95. In addition, the durable material is capable of resisting environmental factors, such as ultra-violet degradation and extreme hot and cold conditions. Exemplary embodiment protective component 100 is resistant to hot and cold temperatures ranging from about −50° F. to about 300° F.

Exemplary embodiment protective component 100 for the power cable of an industrial magnetic lifting device is thus simple to manufacture and assemble or attach to power cable 15, and shields the power cable from physical damage during operation of the lifting device, while allowing the power cable to maintain flexibility or bend as needed for proper operation of the lifting device.

It should be understood that protective component 100 of the present invention could be formed from any suitably hard, robust and/or durable material, so that the power cable disposed through the protective component is sufficiently shielded from physical damage during use of the industrial magnetic lifting device.

Protective component 100 of the present invention can have top portions and bottom portions having different shapes and sizes that cooperate with one another, without changing the overall concept or operation of the present invention. Protective component 100 of the present invention can be utilized with any size power cable, without changing the overall concept or operation of the present invention. Protective component 100 of the present invention can be utilized on all types of industrial lifting devices, without changing the overall concept or operation of the present invention. Protective component 100 of the present invention can have different sizes, lengths, dimensions and the like, without changing the overall concept or operation of the present invention. Protective component 100 of the present invention can be formed from plastics, nylon, rubber, or any other suitably robust material, without changing the overall concept or operation of the present invention.

It is to be understood that the general structure and arrangement of the above-described protective component for the power cable of an industrial magnetic lifting device of the present invention may be altered or rearranged without affecting the overall concept or operation of the invention.

Accordingly, the protective component for a power cable of an industrial magnetic lifting device of the present invention is simplified, provides an effective, safe, inexpensive, and efficient structure which achieves all the enumerated objectives, provides for eliminating difficulties encountered with prior art axle/suspension systems, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to a specific embodiment. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the protective component for a power cable of an industrial magnetic lifting device of the present invention is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A protective component for a power cable of an industrial electro-magnetic lifting device comprising:

A body having a top portion, a and a bottom portion, and a length along said top and bottom portions, said top portion including a plurality of non-uniform external radii along said length of said top portion, said body having an opening formed through said top portion and an opening formed through said bottom portion along the lengths of the top and bottom portions, said top portion opening and said bottom portion opening being continuous with one another to enable said protective component to be disposed around a power cable, said bottom portion including a plurality of non-uniform internal radii along the length of the bottom portion, said body top portion nests within said body bottom portion opening of a second protective component disposed around said power cable, said bottom portion opening of said second protective component cooperating with said body top portion to restrict movement of the second protective component to no more than 13 degrees relative to a longitudinal centerline of said protective component body, said protective component body top portion being free of interlocking connections to said body bottom portion opening of said second protective component.

2. The protective component for a power cable of an industrial electro-magnetic lifting device of claim 1, wherein said protective component is formed of a high-density polymer.

3. The protective component for a power cable of an industrial electro-magnetic lifting device of claim 2, wherein said high-density polymer is resistant to degradation by ultra-violet rays.

4. The protective component for a power cable of an industrial magnetic lifting device of claim 2, wherein said high-density polymer is resistant to extreme hot and cold temperatures of from about −50° F. to about 300° F.

5. The protective component for a power cable of an industrial electro-magnetic lifting device of claim 2, wherein said high-density polymer is formed of a material selected from the group consisting of plastic, nylon, and rubber.

6. The protective component for a power cable of an industrial electro-magnetic lifting device of claim 2, wherein said high-density polymer has a durometer preferably of from about 25 to about 100.

7. The protective component for a power cable of an industrial electro-magnetic lifting device of claim 2, wherein said high-density polymer has a durometer more preferably of from about 65 to about 95.

8. The protective component for a power cable of an industrial electro-magnetic lifting device of claim 1, wherein a plurality of said protective components are disposed around said power cable, each consecutive one of said plurality of protective components having said top portion of a preceding one of the plurality of protective components nested within said bottom portion opening.

9. The protective component for a power cable of an industrial electro-magnetic lifting device of claim 1, wherein said protective component is bell shaped.

10. The protective component for a power cable of an industrial electro-magnetic lifting device of claim 1, wherein said protective component tapers from said bottom end to said top end.

11. The protective component for a power cable of an industrial electro-magnetic lifting device of claim 1, wherein said bottom portion of said second protective component contacts a shoulder of said top portion to restrict movement of the second protective component to no more than 13 degrees relative to said longitudinal centerline of said protective component body.

* * * * *

UNITED STATES PATENT AND TRADEMARK OFFICE
CERTIFICATE OF CORRECTION

PATENT NO. : 10,033,171 B2  
APPLICATION NO. : 15/357152  
DATED : July 24, 2018  
INVENTOR(S) : Joseph T. Schatz Page 1 of 1

It is certified that error appears in the above-identified patent and that said Letters Patent is hereby corrected as shown below:

In the Claims

Claim 1, Column 7, Line 8, after the word "portion," delete the words "a and".

Signed and Sealed this  
Twenty-eighth Day of August, 2018

Andrei Iancu  
*Director of the United States Patent and Trademark Office*